United States Patent
Maruhashi

(10) Patent No.: US 10,848,666 B2
(45) Date of Patent: Nov. 24, 2020

(54) IMAGE CAPTURING DEVICE AND CONTROL METHOD

(71) Applicant: CANON KABUSHIKI KAISHA, Tokyo (JP)

(72) Inventor: Naoka Maruhashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/056,213

(22) Filed: Aug. 6, 2018

(65) Prior Publication Data

US 2019/0052804 A1  Feb. 14, 2019

(30) Foreign Application Priority Data

Aug. 8, 2017  (JP) .................................. 2017-153205
May 9, 2018  (JP) .................................. 2018-090439

(51) Int. Cl.
| | | |
|---|---|---|
| H04N 5/232 | (2006.01) |
| H04N 1/32 | (2006.01) |
| G06T 1/00 | (2006.01) |
| H04N 9/82 | (2006.01) |
| H04N 5/77 | (2006.01) |
| H04N 1/21 | (2006.01) |
| G06T 7/20 | (2017.01) |
| H04N 101/00 | (2006.01) |

(52) U.S. Cl.
CPC ....... *H04N 5/23229* (2013.01); *G06T 1/0007* (2013.01); *H04N 1/21* (2013.01); *H04N 1/32128* (2013.01); *H04N 5/232* (2013.01); *H04N 5/23218* (2018.08); *H04N 5/23219* (2013.01); *H04N 5/23222* (2013.01); *H04N 5/23299* (2018.08); *H04N 5/772* (2013.01); *H04N 9/8205* (2013.01); *G06T 7/20* (2013.01); *H04N 2101/00* (2013.01); *H04N 2201/0084* (2013.01); *H04N 2201/3256* (2013.01)

(58) Field of Classification Search
CPC .. H04N 1/2112; H04N 1/215; H04N 1/32128; H04N 5/23218; H04N 5/23219; H04N 5/23229
See application file for complete search history.

(56) References Cited

U.S. PATENT DOCUMENTS

| | | | |
|---|---|---|---|
| 2004/0086265 A1* | 5/2004 | Tojo | G11B 27/034 386/248 |
| 2010/0295944 A1* | 11/2010 | Takeuchi | G06K 9/00771 348/143 |

FOREIGN PATENT DOCUMENTS

JP  2010273125 A  12/2010

* cited by examiner

*Primary Examiner* — Daniel M Pasiewicz
(74) *Attorney, Agent, or Firm* — Canon U.S.A., Inc. IP Division

(57) ABSTRACT

An image capturing device includes a setting unit configured to set, based on a type of metadata to be added to a captured image, a generation frequency of the metadata, and a control unit configured to perform control to generate the metadata at the generation frequency set by the setting unit.

18 Claims, 12 Drawing Sheets

FIG.3

| | TYPE OF METADATA |
|---|---|
| METADATA ABOUT HUMAN BODY | COLOR OF CLOTHES, HEIGHT, SEX, AGE, MOVING DIRECTION, AND HUMAN BODY ID |
| METADATA ABOUT VEHICLE | COLOR, LICENSE PLATE, TYPE OF VEHICLE, MOVING DIRECTION, AND VEHICLE ID |
| OTHER METADATA | IMAGE CAPTURING DEVICE ID, INSTALLATION POSITION OF IMAGE CAPTURING DEVICE, DIRECTION OF IMAGE CAPTURING DEVICE, PARAMETERS AT TIME OF IMAGE CAPTURING (ZOOM, SHUTTER SPEED, ETC.), WEATHER, TEMPERATURE, CONNECTED EXTERNAL DEVICE ID, AND NUMBER OF CONNECTED EXTERNAL DEVICES |

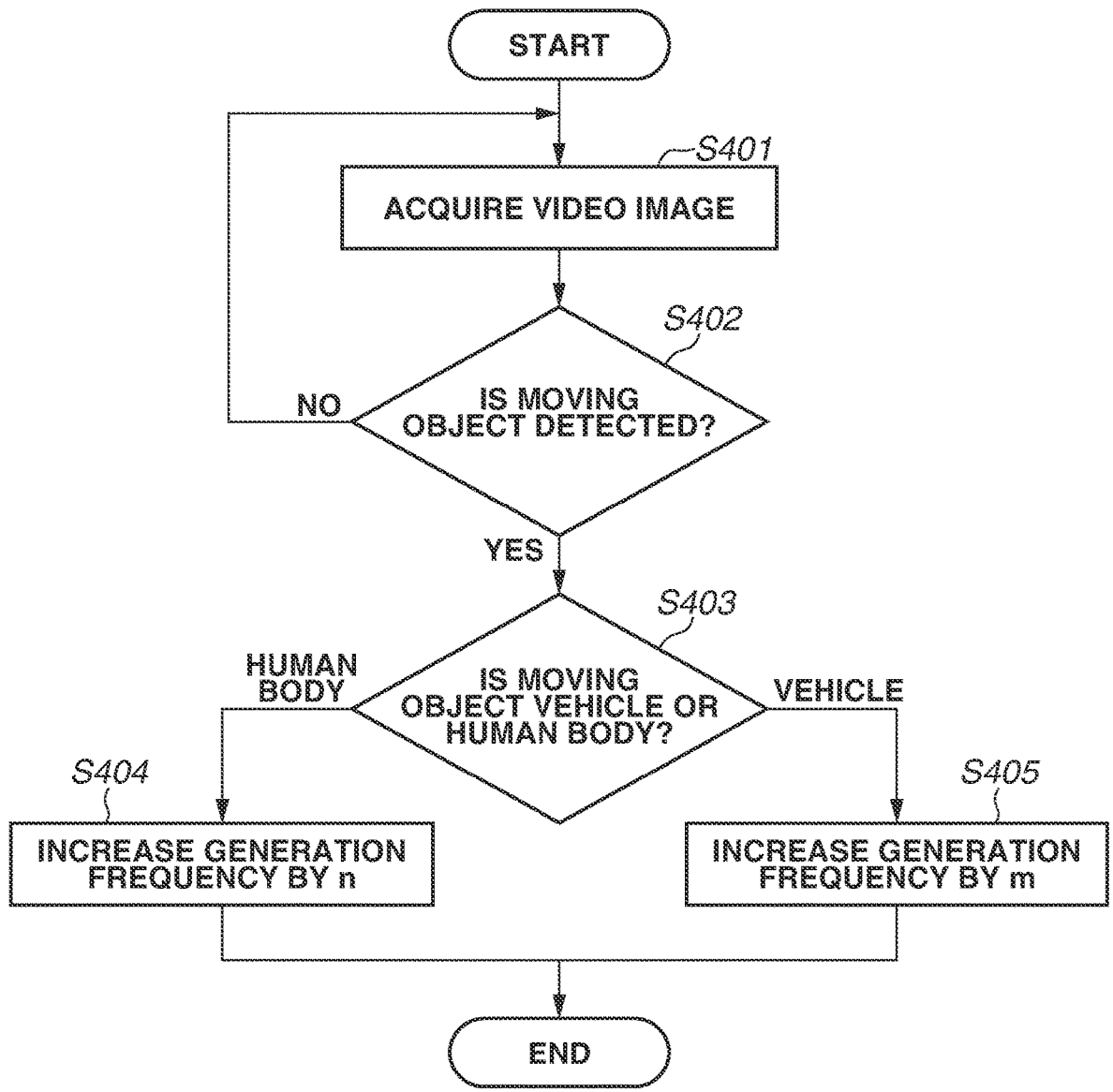

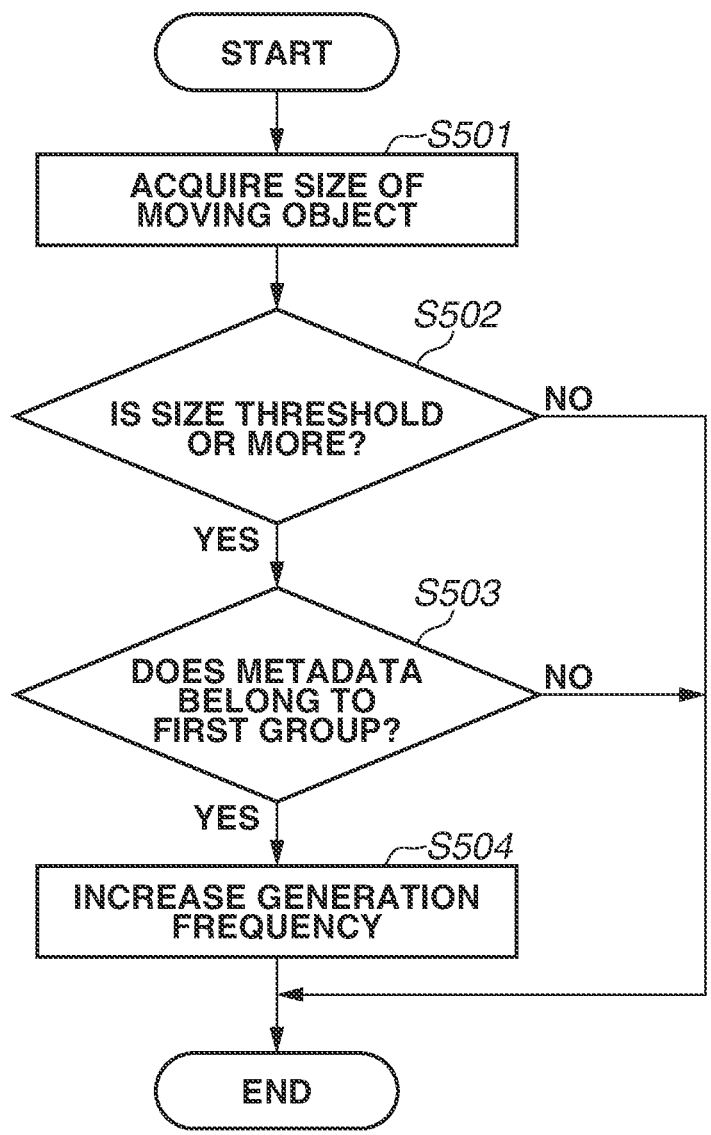

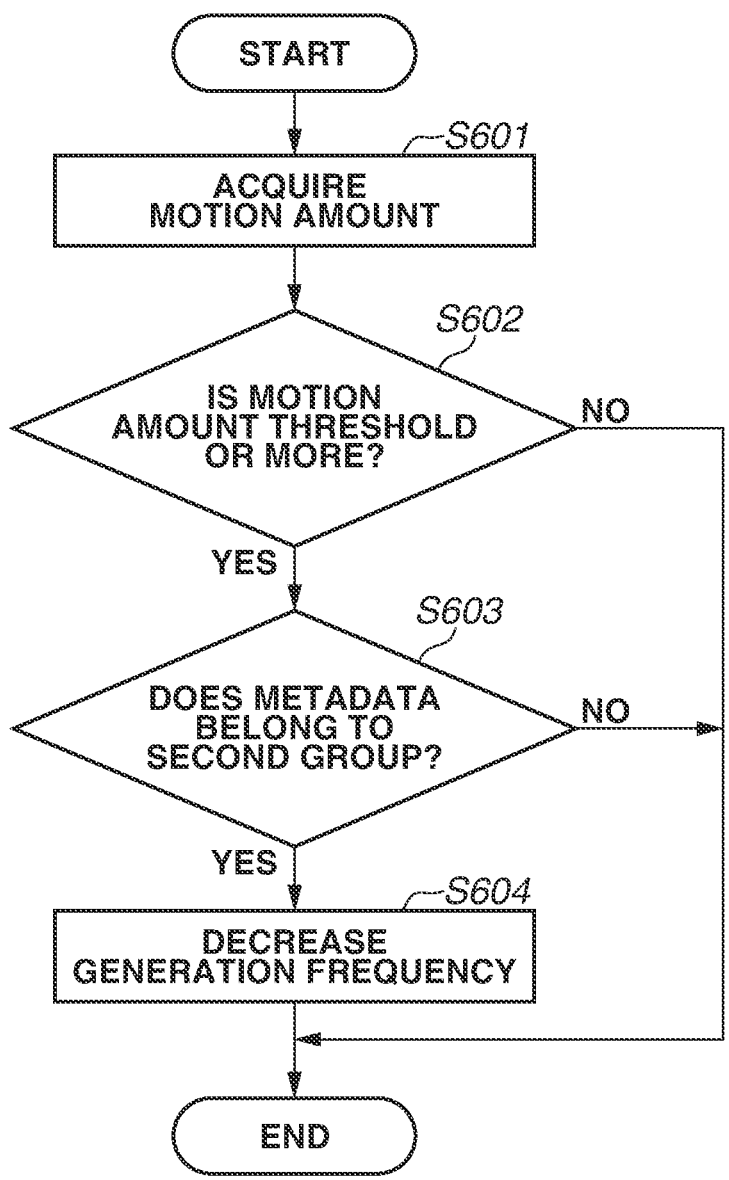

FIG.7

| VIDEO IMAGE ANALYSIS<br>METADATA | | OBJECT RECOGNITION | DETECTION SIZE IS THRESHOLD OR MORE | IMAGE BLURRING IS PRESENT |
|---|---|---|---|---|
| VEHICLE | LICENSE PLATE, TYPE OF VEHICLE | ++ | + | - |
| | COLOR OF VEHICLE | ++ | | |
| PERSON | AGE, SEX | + | + | - |
| | COLOR OF CLOTHES | + | | |
| OTHER METADATA | TEMPERATURE, WEATHER | | | |

FIG.12
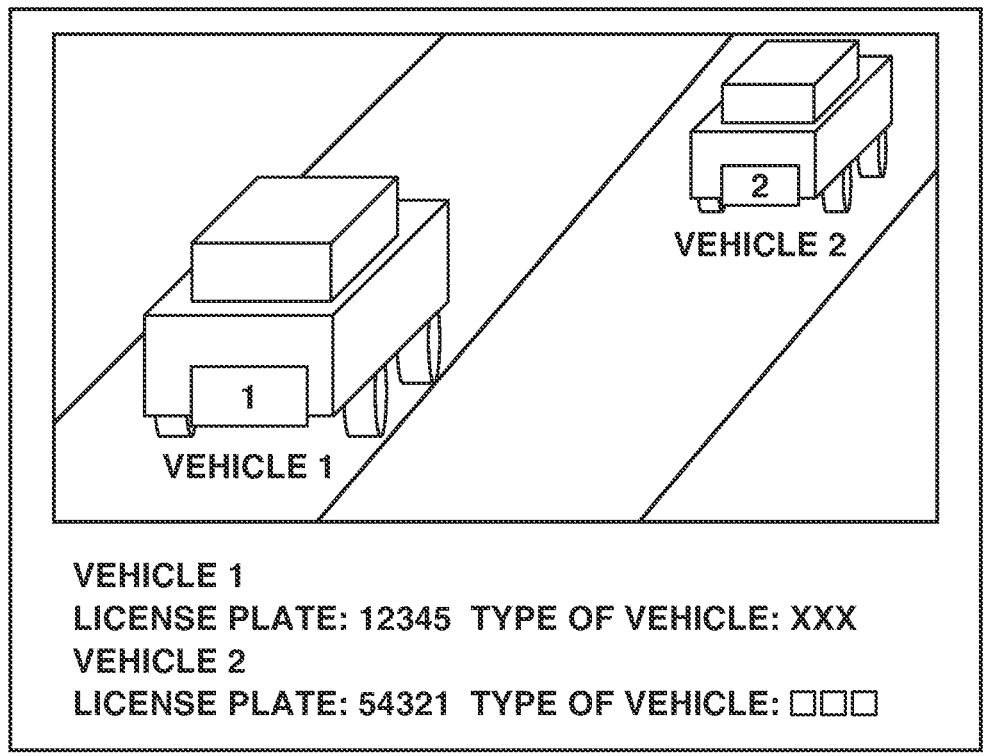
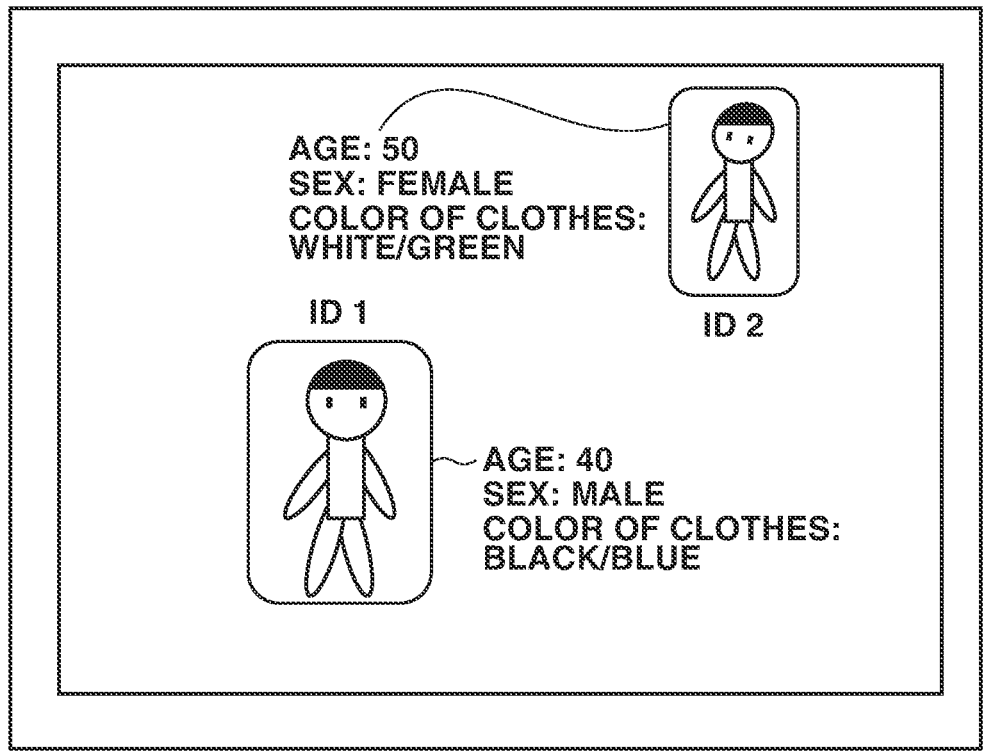

IMAGE CAPTURING DEVICE AND CONTROL METHOD

BACKGROUND

Field of the Disclosure

The present disclosure relates to an image capturing device, a control method, and a control program.

Description of the Related Art

In recent years, a video image is acquired by a fixed type image capturing device, such as a monitoring camera, and information which is requested by a user and is acquired from the video image can be easily checked. In order to provide a video image or information required by the user, it is necessary to add metadata which can be acquired from a video image or an image capturing device, and some types of metadata are required. In order to generate metadata, various image analysis processing such as an object detection, color extraction, character recognition, and face recognition is required in accordance with the types of metadata.

Japanese Patent Application Laid-Open No. 2010-273125 discusses the following technique: communication is made between an image capturing device and an external analysis server, and if there is a field (person, vehicle, etc.) on which metadata analysis can be performed by the analysis server, the analysis server executes processing, and if there is a field on which metadata analysis cannot be performed by the analysis server, the image capturing device executes processing.

However, since a resource of the image capturing device is limited, if metadata is frequently generated, an excessive load is applied to the image capturing device. Further, quality of an image acquired by the image capturing device is not always satisfactory, and the quality is deteriorated in accordance with setting conditions and an environment of an installation place at image capturing. In this case, the metadata may have low reliability.

Accordingly, there is a need for an image capturing device to perform control so that metadata of a captured image is generated at an appropriate frequency.

SUMMARY

According to an aspect of the present disclosure, an image capturing device including a setting unit configured to set, based on a type of metadata to be added to a captured image, a generation frequency of the metadata, and a control unit configured to perform control to generate the metadata at the generation frequency set by the setting unit.

Further features of the present disclosure will become apparent from the following description of exemplary embodiments with reference to the attached drawings.

BRIEF DESCRIPTION OF THE DRAWINGS

FIG. 3 is a diagram illustrating an example of a type of metadata.

FIG. 4 is a flowchart illustrating setting processing according to one or more aspects of the present disclosure.

FIG. 5 is a flowchart illustrating first adjustment processing according to one or more aspects of the present disclosure.

FIG. 6 is a flowchart illustrating second adjustment processing according to one or more aspects of the present disclosure.

FIG. 7 is a diagram illustrating an example of increase/decrease of a generation frequency of metadata.

FIG. 12 is a diagram illustrating display example of the metadata.

DESCRIPTION OF THE EMBODIMENTS

Exemplary embodiments of the present disclosure will be described below with reference to the drawings.

Figure 1:
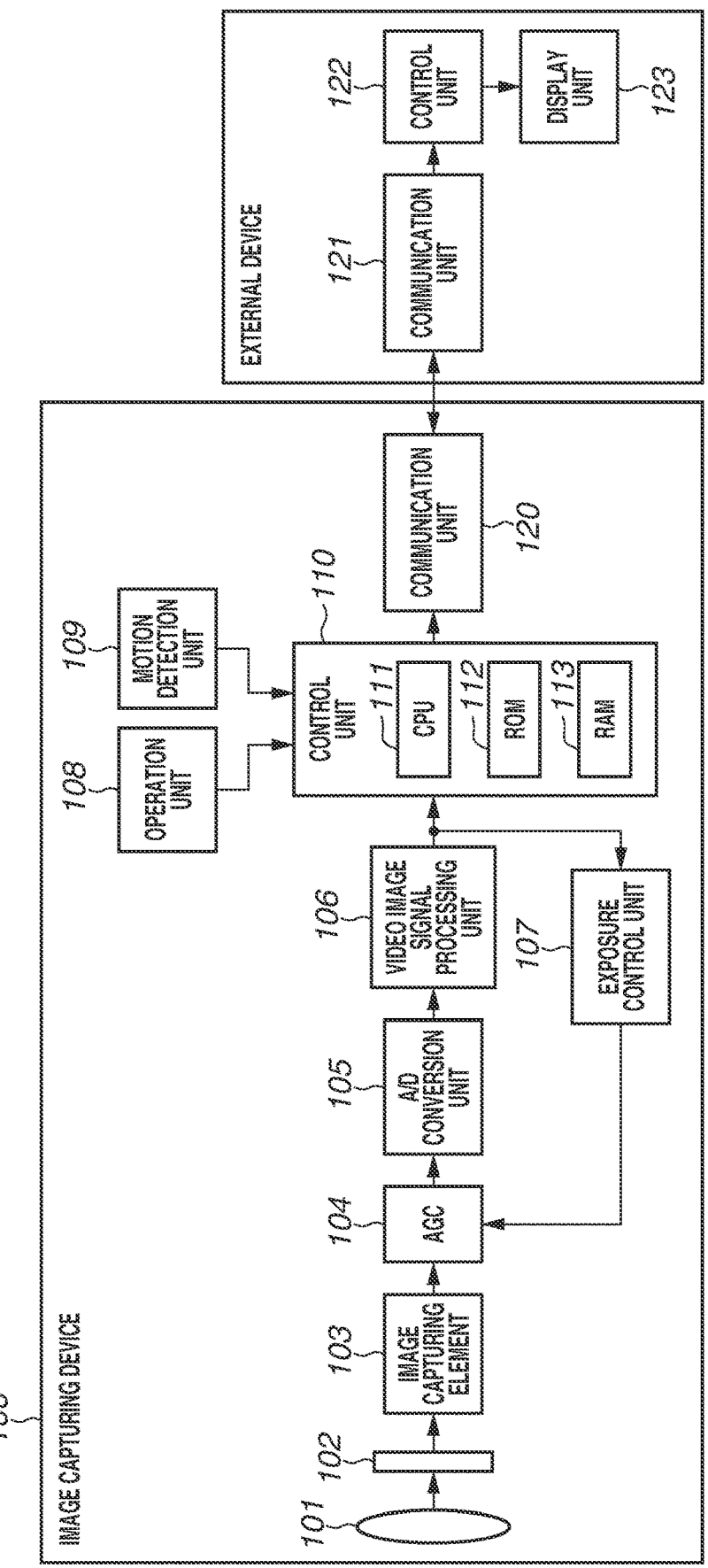
FIG. 1 is a hardware configurational diagram of an image capturing device according to one or more aspects of the present disclosure.

FIG. 1 is a hardware configuration diagram of an image capturing device 100 according to a first exemplary embodiment. In FIG. 1, a lens group 101 serves as an optical system for focusing light, which travels from a subject and passes through the lens group 101, on an image capturing element 103. The lens group 101 includes a focus lens for focusing on a subject, and a zoom lens for adjusting a viewing angle. Light that has passed through the lens group 101 passes through an optical filter 102, and enters the image capturing element 103. As the optical filter 102, for example, an infrared radiation cut filter (IRCF) is provided. Information about a captured video image is acquired in such a manner that the light passes through color filters disposed for each of pixels of a light receiving surface of the image capturing element 103 in a predetermined order and is received by the image capturing element 103. The image capturing element 103 outputs the video image of an image capturing target as an analog signal.

The video image formed on the image capturing element 103 is gain-controlled by automatic gain control (AGC) 104, and luminance of a video signal is adjusted. The video signal is converted from the analog signal into a digital signal by an analog-digital (A/D) conversion unit 105. A video signal processing unit 106 executes predetermined processing on the digital signal from the A/D conversion unit 105, outputs a luminance signal and a color signal of each pixel, generates a video image to be output, and generates parameters to be used for controlling the image capturing device 100. Examples of the parameters to be used for controlling the image capturing device 100 include parameters to be used for controlling an aperture, focusing, and white balance for adjusting a tint.

An exposure control unit 107 calculates luminance information in an image capture screen from the luminance information output from the video signal processing unit 106 to control the aperture and make automatic gain control (AGC) so that the captured image is adjusted to desired luminance. An operation unit 108 accepts user operations. A motion detection unit 109 detects presence/absence of a motion and a motion amount of the image capturing device 100. The motion detection unit 109 is, for example, an acceleration sensor. A control unit 110 controls whole of the image capturing device 100. A communication unit 120 communicates with a communication unit 121 of an external device. The communication unit 120 transmits, for example, a video signal generated by the video signal processing unit 106 to the external device. Further, the communication unit 120 can transmit metadata generated by the image capturing device 100 to the external device. The external device processes the video signal and the metadata received by a control unit 122 from the communication unit 121 to display the video image and the metadata on a display unit 123.

A central processing unit (CPU) 111 of the control unit 110 reads a control program stored in a read-only memory (ROM) 112 to execute various processing. A random-access memory (RAM) 113 is used as a temporary storage area, such as a main memory or a work area of the CPU 111. Functions and processing of the image capturing device 100, described below, are implemented in such a manner that the CPU 111 reads a program stored in the ROM 112 and executes the program. Further, in another example, the CPU 111 can read a program stored in a recording medium, such as a secure digital (SD) card, instead of the ROM 112.

Further, in yet another example, at least some of the functions and processing of the image capturing device 100 can be implemented by in cooperation of, for example, a plurality of CPUs, RAMS, ROMs, and storages. In yet another example, at least some of the functions and processing of the image capturing device 100 can be implemented by using a hardware circuit.

Figure 2:
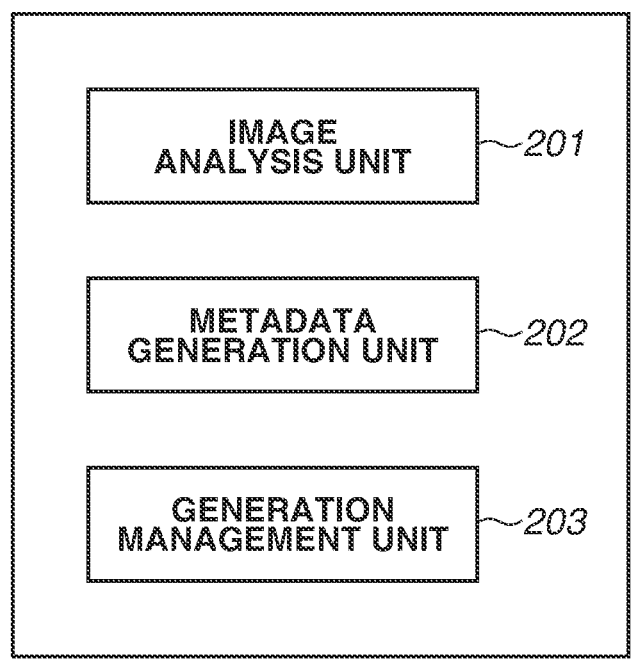
FIG. 2 is a function configurational diagram of the image capturing device.

FIG. 2 is a function configurational diagram of the image capturing device 100. The image analysis unit 201 executes image analysis processing on the video image acquired by the video signal processing unit 106. The image analysis processing includes object recognition, detection of a moving object, color extraction, face recognition, and character recognition. A metadata generation unit 202 generates metadata based on an analysis result of the image analysis unit 201 and adds the result to the video image. A specific method for associating the metadata with the video image is not limited to the exemplary embodiment. In another example, the metadata generation unit 202 can allocate an identifier to the video image and the metadata so that the video image and the metadata are associated with each other. The processing for generating metadata in the metadata generation unit 202 is an example of control processing for making control so that metadata is generated and generation processing for generating metadata.

A generation management unit 203 manages generation of metadata in the metadata generation unit 202. Specifically, the generation management unit 203 sets a generation frequency of metadata for each type of metadata, as a setting unit. FIG. 3 is a diagram illustrating an example of types of metadata. In the present exemplary embodiment, metadata are roughly divided into metadata about human body, metadata about a vehicle, and metadata about the other matters. The metadata about a human body includes a color of clothes, a height, a sex, an age, and a moving direction. Further, the metadata about a vehicle includes a color, display of a license plate, a type of a vehicle, and a moving direction. The metadata about the other matters includes an ID of the image capturing device 100 that has captured a video image, and an installation position of the image capturing device 100, a direction of the image capturing device 100, and image capturing parameters (a zoom, and a shutter speed, etc.) of the image capturing device 100, weather, and temperature. Further, in a case where the image capturing device 100 transmits metadata to the external device, the generation management unit 203 executes setting processing on a transmission frequency of metadata.

Herein, for example, the ID and the installation position of the image capturing device 100 that are the metadata about the other matters are non-changing metadata that does not change at each image capturing. On the other hand, a color of clothes worn by a person, and display of a license plate of a vehicle are metadata that may change at each image capturing. Since the non-changing metadata is unlikely to change, if this metadata is once acquired, it is not necessary to generate the metadata many times. Further, since a color of clothes worn by a person, a color of a vehicle, and the like can be distinguished with a comparatively sufficient accuracy, metadata does not have to be generated repeatedly. On the other hand, recognition accuracy of characters displayed on a license plate and image analytic accuracy of estimation of an age of a human figure greatly depends on an acquired video image.

The image capturing device 100 according to the present exemplary embodiment generates a plurality of metadata illustrated in FIG. 3 at predetermined intervals, and adds the plurality of metadata to a video image. Further, the image capturing device 100 sets a generation frequency of the metadata for each metadata. FIG. 4 is a flowchart illustrating setting processing to be executed by the image capturing device 100. The setting processing is for setting a generation frequency of metadata. At start of the generation frequency setting processing, preset initial values are allocated as the generation frequencies of respective metadata illustrated in FIG. 3. In the setting processing, the generation frequencies are set by appropriately increasing the initial values.

In step S401, the image analysis unit 201 acquires a video image. In step S402, the image analysis unit 201 detects a moving object in the video image. In a case where the image analysis unit 201 detects a moving object (YES in step S402), the processing proceeds to step S403. In a case where the image analysis unit 201 does not detect a moving object (NO in step S402), the processing proceeds to step S401. In step S403, the image analysis unit 201 performs recognition processing for determination of whether the moving object is a human body or a vehicle. In a case where the moving object is a human body (HUMAN BODY in step S403), the processing proceeds to step S404. In a case where the moving object is a vehicle (VEHICLE in step S403), the processing proceeds to step S405.

In step S404, the generation management unit 203 increases the generation frequency of metadata about the human body by n. On the other hand, in step S405, the generation management unit 203 increases the generation frequency of metadata about the vehicle by m. The processing then ends. The value m is larger than the value n. A moving speed of the vehicle is higher than a moving speed of the human body. Therefore, the generation frequency of the metadata about the vehicle is set to a value larger than a value of the generation frequency of the metadata about the human body. As a result, metadata can be generated without fail even about a vehicle moving with high speed. The processing in step S403, step S404, and step S405 is for increasing the generation frequency of the case where the object is a moving object in comparison with the generation frequency of a case where the object is not a moving object. That is, the processing in step S403, step S404, and step S405 is an example of the processing for setting the generation frequency based on a size of an object.

FIG. 5 is a flowchart illustrating first adjustment processing which is executed by the image capturing device 100. The first adjustment processing is processing for adjusting the generation frequency of the metadata set in the setting processing. In step S501, the image analysis unit 201 specifies a size of the recognized moving object. In step S502, the generation management unit 203 compares the size of the moving object specified in step S501 with a preset threshold. In a case where the generation management unit 203 determines that the size of the moving object is the threshold or more (YES in step S502), the processing proceeds to step S503. In a case where the generation management unit 203 determines that the size of the moving object is less than the threshold (NO in step S502), the processing ends.

In step S503, the generation management unit 203 checks whether metadata to be processed among the pieces of the metadata illustrated in FIG. 3 belongs to a first group. In a case where the generation management unit 203 determines that the metadata belongs to the first group (YES in step S503), the processing proceeds to step S504. In a case where the generation management unit 203 determines that the metadata does not belong to the first group (NO in step S503), the processing ends. In step S504, the generation management unit 203 increases the generation frequency of the metadata to be processed by a predetermined amount. The processing then ends. The processing in step S504 is an example of the processing for setting a higher generation frequency to the metadata belonging to the first group in a case where the size of the object is the threshold or more, in comparison with the generation frequency of the metadata other than the metadata belonging to the first group.

In a case where the size of the moving object is a constant value or more, the metadata belonging to the first group are metadata such that accuracy and reliability are increased. Such metadata is set in advance in the image capturing device 100 as a metadata belonging to the first group. Examples of the metadata belonging to the first group include display of a license plate of a vehicle and an age of a human body. For example, among license plates, characters of a license plate for a large vehicle can be easily recognized because character blurring or the like does not occur, and accuracy is heightened. The reliability of the metadata is thus improved. Therefore, accurate information can be increased by increasing the generation frequency of metadata. On the other hand, for a color of a vehicle, for example, color extraction can be performed even if the vehicle is small, and the accuracy is not always improved even if the vehicle is large. For this reason, even if the size is a constant value or more, the generation frequency does not have to be increased. Therefore, a color of a vehicle is set as metadata that does not belong to the first group.

In step S504, to which extent the generation frequency is increased is not particularly limited. In another example, the generation management unit 203 may increase the generation frequency by a predetermined rate based on a generation frequency set before the processing in step S504. Further, in another example, depending on a size, the generation management unit 203 may change the extent of increase in the generation frequency.

FIG. 6 is a flowchart illustrating second adjustment processing which is executed by the image capturing device 100. The second adjustment processing is for adjusting the generation frequency of the metadata set in the setting processing, similarly to the first adjustment processing. The second adjustment processing is executed after the first adjustment processing. In another example, the second adjustment processing may be executed first.

In step S601, the generation management unit 203 acquires a motion amount detected by the motion detection unit 109. The motion amount may be obtained by calculating a motion vector from an image in the image analysis unit 201 instead of detection by the motion detection unit 109. In step S602, then, the motion amount is compared with a preset threshold. In a case where the generation management unit 203 determines that the motion amount is the threshold or more (YES in step S602), the processing proceeds to step S603. In a case where the generation management unit 203 determines that the motion amount is less than the threshold (NO in step S602), the processing ends.

In step S603, the generation management unit 203 checks whether metadata to be processed among the pieces of the metadata illustrated in FIG. 3 belongs to a second group. In a case where the generation management unit 203 determines that the metadata belongs to the second group (YES in step S603), the processing proceeds to step S604. In a case where the generation management unit 203 determines that the metadata does not belong to the second group (NO in step S603), the processing ends. In step S604, the generation management unit 203 decreases a generation frequency of the metadata to be processed by a predetermined amount. The processing then ends. The processing in step S604 is an example of the processing for setting a lower generation frequency to the metadata belonging to the second group in a case where the motion amount is the threshold or more, in comparison with the generation frequencies of the other pieces of metadata other than the metadata belonging to the second group.

The metadata belonging to the second group is metadata that reliability is deteriorated in a case where a motion occurs. Pieces of such metadata are set in advance in the image capturing device 100 as metadata belonging to the second group. Examples of the metadata belonging to the second group include display of a license plate of a vehicle. As for the license plate, character recognition accuracy is deteriorated when characters are blurred. Therefore, in a case where a detected amount of motion is a constant value or more, the generation frequency is decreased in order to reduce a processing load for generating metadata having low accuracy. On the other hand, even if an image is blurred, a color of a vehicle can be extracted accurately. Therefore, the color of a vehicle is set as metadata that does not belong to the second group.

In step S604, to which extent the generation frequency is increased is not particularly limited. In another example, the generation management unit 203 may decrease the generation frequency by a predetermined rate based on a generation frequency set before the processing in step S604. Further, in another example, depending on a motion amount, the generation management unit 203 may change the extent of increase in the generation frequency.

FIG. 7 is a diagram illustrating an example of increase/decrease in the generation frequencies of the metadata in the setting processing (FIG. 3), the first adjustment processing (FIG. 5), and the second adjustment processing (FIG. 6). The processing for detecting a size of a moving object in the first adjustment processing and the processing for detecting the motion amount in the second adjustment processing are examples of the image analysis processing. The setting processing, the first adjustment processing, and the second adjustment processing are examples of the setting processing for setting the generation frequencies based on a result of image analysis.

As described above, the image capturing device 100 according to the first exemplary embodiment sets a generation frequency of metadata in accordance with a type of metadata, an analysis result of an image, a motion amount, and the like. As a result, the image capturing device 100 can perform control so that metadata are generated at an appropriate frequency with which excessive generation and insufficiency of metadata are prevented. In a case where a zoom amount and an installation environment are supposed not to be frequently changed, a size and a motion amount of a moving object are not frequently changed. For this reason, the image capturing device 100 can continuously use a generation frequency that is once set.

In a first modification of the first exemplary embodiment, in step S504 of the first adjustment processing (FIG. 5), the generation frequency is increased. This is because many pieces of accurate information is accumulated by increasing the generation frequency. However, in a case where the size of the moving object is the threshold or more and the metadata belongs to the first group, the reliability of the metadata is high. For this reason, the generation of metadata does not have to be repeated in a certain case. In such a case, in step S504, the generation frequency may be decreased. As a result, the processing load relating to the generation of metadata can be reduced.

Further, in a second modification, an image analysis result to be referred at setting of the generation frequency is not limited to a size of a moving object or a motion amount. In another example, the image analysis result may be a noise or the like when illuminance is low. That is, the image capturing device 100 may set the generation frequency in accordance with a noise.

In a third modification, the image capturing device 100 may set the generation frequency of metadata in accordance with a user operation. In this case, the image capturing device 100 gives priority to settings by the user, and the above-described processing relating to the setting of the generation frequency is executed on such metadata that is not subjected to the setting of a generation frequency by the user.

In the image capturing device 100 according to a fourth modification, a detection frequency of a moving object in step S402 illustrated in FIG. 4 is not particularly limited. For example, the image capturing device 100 may detect a moving object in each frame of a video image, or performs the other image analyses at a generation frequency of metadata. Further, in another example, the image capturing device 100 may detect a moving object at the generation frequency of metadata.

In the exemplary embodiment, a description has been provided of a case where a captured image to which metadata is to be added is a video image, as an example. In a fifth modification, a target to which metadata is to be added may be a still image.

In a sixth modification, the image capturing device 100 may set a generation frequency by the processing described in the exemplary embodiment for metadata about not only a moving object in the video image but also a still object (a person or a vehicle). In step S501 of FIG. 5, the image capturing device 100 may acquire, for example, a size of an object instead of a moving object.

Figure 8:
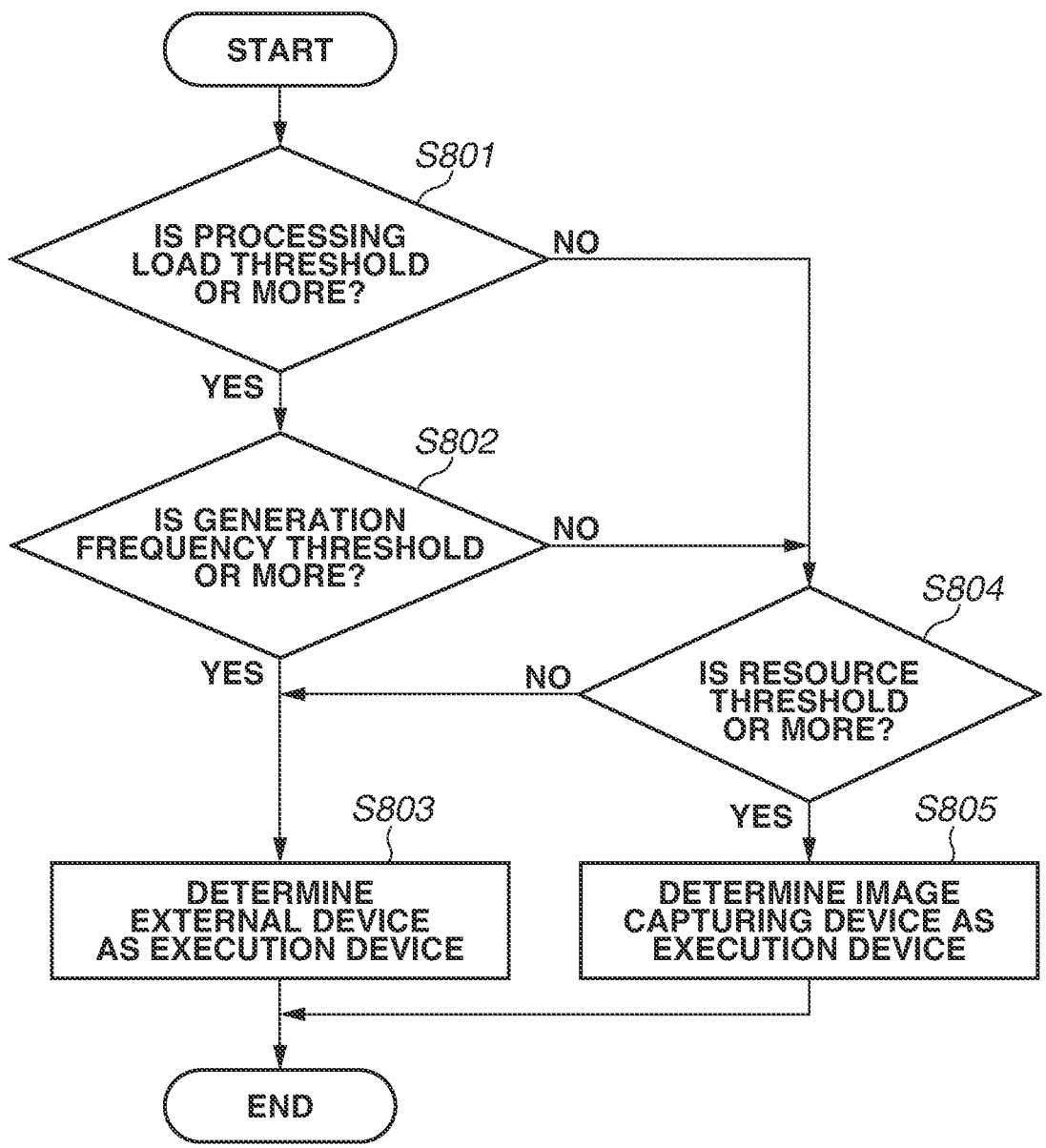
FIG. 8 is a flowchart illustrating device setting processing according to one or more aspects of the present disclosure.

The image capturing device 100 according to a second exemplary embodiment will be described below centering on a difference from the image capturing device 100 according to the first exemplary embodiment. The image capturing device 100 according to the second exemplary embodiment causes an external device to appropriately execute the metadata generation processing. FIG. 8 is a flowchart illustrating device setting processing for setting a device that executes the metadata generation processing. In step S801, the generation management unit 203 checks whether a processing load relating to the metadata generation by the metadata generation unit 202 is a preset threshold or more. In a case where the generation management unit 203 determines that the processing load is the threshold or more (YES in step S801), the processing proceeds to step S802. In a case where the generation management unit 203 determines that the processing load is less than the threshold in (NO in step S801), the processing proceeds to step S804. The generation management unit 203 uses, for example, resource usage rates and processing times during execution of the processing by the image analysis unit 201 and the metadata generation unit 202 relating to the metadata generation as evaluation values of the processing load.

In step S802, the generation management unit 203 checks a generation frequency set for metadata to be processed. In a case where the generation management unit 203 determines that the generation frequency is a preset threshold or more (YES in step S802), the processing proceeds to step S803. In a case where the generation management unit 203 determines that the generation frequency is less than the threshold (NO in step S802), the processing proceeds to step S804. In step S803, the generation management unit 203 determines, as a determination unit, an external device as a device that executes the metadata generation processing. The processing then ends. In this case, the generation management unit 203 transmits a metadata generation instruction together with a video image to the external device via the communication unit 120. This processing is an example of control processing for making control so that metadata is generated.

Further, in step S804, the generation management unit 203 checks whether a number of resources usable by the image capturing device 100 for generation of metadata is the preset threshold or more. In a case where the generation management unit 203 determines that the number of resources is the threshold or more (YES in step S804), the processing proceeds step S805. In a case where the generation management unit 203 determines that the number of resources is less than the threshold (NO in step S804), the processing proceeds to step S803. In step S805, the generation management unit 203 determines, as a determination unit, the image capturing device 100 as a device that executes the metadata generation processing. The processing then ends. The other parts of the configuration and processing of the image capturing device 100 according to the second exemplary embodiment are similar to the configuration and the processing of the image capturing device 100 according to the first exemplary embodiment.

As described above, the image capturing device 100 according to the second exemplary embodiment can distribute the metadata generation processing between the image capturing device 100 and the external device. As a result, the load in the metadata generation processing does not affect a function for image capturing.

A third exemplary embodiment will be described below. In the third exemplary embodiment, the image analysis unit 201 detects a moving object in an acquired video image and acquires an ID for identifying the detected moving object to provide the ID to each detected moving object. The object ID that is the identification information about the moving object may be used as metadata, but herein the object ID is used for setting a generation frequency of metadata other than the moving object ID.

Figure 9:
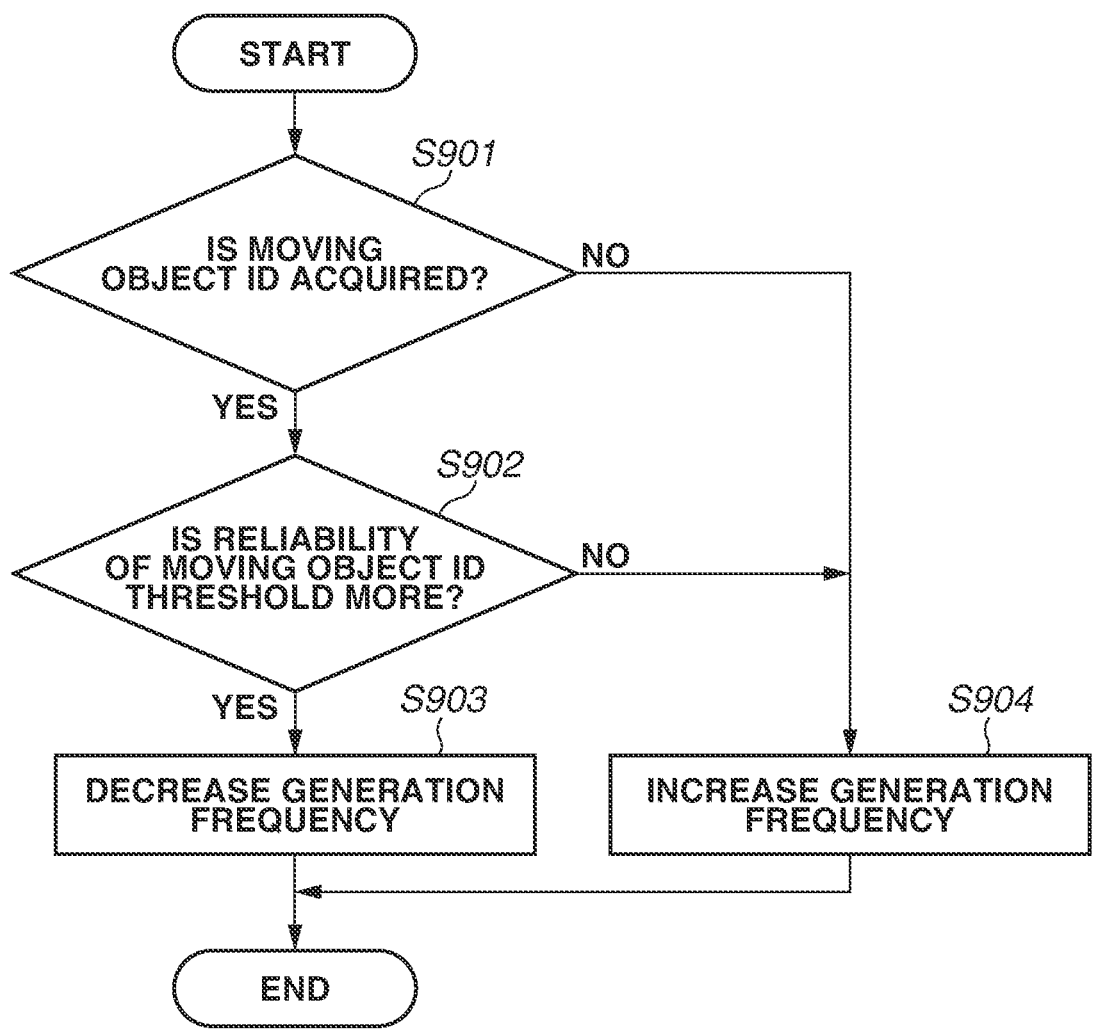
FIG. 9 is a flowchart illustrating third adjustment processing according to one or more aspects of the present disclosure.

FIG. 9 is a flowchart illustrating third adjustment processing to be executed by the image capturing device 100 according to the third exemplary embodiment. In step S901, the image analysis unit 201 checks an acquisition state of a moving object ID. In a case where the image analysis unit 201 determines that the moving object ID is not acquired (NO in step S901), the processing proceeds to step S904. In a case where the image analysis unit 201 determines that the moving object ID is acquired (YES in step S901), the processing proceeds to step S902. In step S902, the image analysis unit 201 further checks reliability of the acquired moving object ID. In a case where the reliability of the moving object ID is a preset threshold or more (YES in step S902), the processing proceeds to step S903. In a case where the reliability of the moving object ID is not the threshold or more (NO in step S902), the processing proceeds to step S904. The reliability of the moving object ID can be calculated by a publicly-known method using nearness of the moving objects detected in frames in a spatial position, luminance of the moving object, or a similarity level of colors.

In step S903, the generation management unit 203 decreases, by a predetermined amount, a generation frequency of metadata about the moving object having a moving object ID of which reliability is the preset threshold or more. On the other hand, in step S904, the generation management unit 203 increases the generation frequency of the metadata by a predetermined amount. The other parts of the configuration and the processing of the image capturing device 100 according to the third exemplary embodiment are similar to the configuration and the processing of the image capturing device 100 according to the exemplary embodiments.

Moving objects provided with the same moving object ID in different frames can be regarded as the same moving objects. In the third exemplary embodiment, in a case where moving objects having the same moving object ID are determined as the same moving objects and the image analysis unit 201 recognizes that the moving object is a person, metadata such as a color of clothes worn by the recognized person and an age of the recognized person are not repeatedly generated. Further, in a case where the image analysis unit 201 recognizes that the moving object is a vehicle, metadata such as a license plate and a color of a vehicle are not repeatedly generated.

However, if repetitive generation of metadata is always prohibited for the moving objects provided with the same moving object ID, metadata may be failed to be generated if a wrong moving object ID is provided. Therefore, in a case where the reliability of a moving object ID is determined to be less than the preset threshold even in a case where the same moving object ID is provided, the generation frequency of metadata is increased. As a result, even if a wrong moving object ID is provided, metadata can be generated without fail.

Further, in a case where a moving object ID is not provided even if a moving object is detected in a captured video image, a determination of whether moving objects are the same as each other cannot be made based on moving object IDs. For this reason, a generation frequency of metadata about such moving objects is made to be higher in this case than in a case where a moving object ID is provided.

On the other hand, in a case where the determination is made that the accuracy and the reliability of the moving object ID provided to the moving object detected in the captured video image are higher than the preset thresholds, the same moving objects exist in different frames. Therefore, for example, if the moving object is a person, the determination can be made that metadata such as an age and a height are unlikely to be changed. In this case, a processing load can be decreased by decreasing the generation frequency of the metadata, and thus a function for image capturing is not affected by the processing load. Even if the determination is made as the same moving objects, a generation frequency of metadata such as a moving direction of a person that may be changed is not decreased.

A fourth exemplary embodiment will be described below. In the first exemplary embodiment, the image capturing device 100 adjusts, with respect to an entire area of an acquired video image, a generation frequency of metadata about a person or a vehicle that has been detected. This means that the entire video image is set as a metadata area. On the contrary, in the image capturing device 100 according to the fourth exemplary embodiment, the entire video image is not set as a metadata area. That is, one partial metadata area or a plurality of partial metadata areas is set on any position or any positions of the video image. An upper limit number of the metadata areas that can be set on any positions may be set by the image capturing device 100 in advance, or may be determined based on a number or an amount of metadata, or a number of target objects whose metadata are to be generated.

Figure 10:
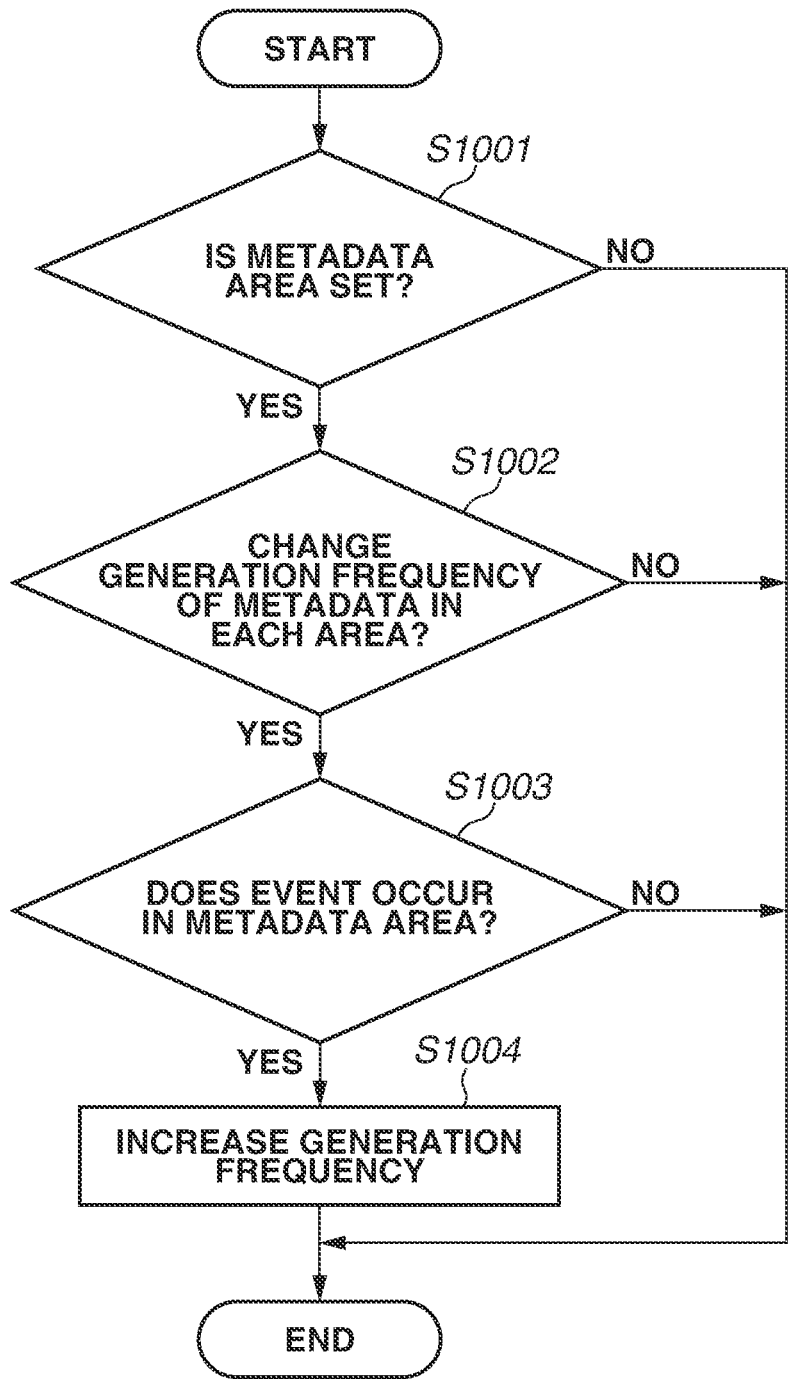
FIG. 10 is a flowchart illustrating generation frequency setting processing for each metadata area according to one or more aspects of the present disclosure.

FIG. 10 is a flowchart illustrating generation frequency setting processing in each metadata area. In step S1001, in a case where the generation management unit 203 does not set a metadata area (NO in step S1001), the processing ends. In a case where the generation management unit 203 sets a metadata area (YES in step S1001), the processing proceeds to step S1002. In a case where the generation management unit 203 does not set a different generation frequency of metadata for each metadata area (NO in step S1002), the processing ends. In a case where the generation management unit 203 sets a different generation frequency of metadata for each metadata area (YES in step S1002), the processing proceeds to step S1003. In a case where the generation management unit 203 determines that an event does not occur in the metadata area (NO in step S1003), the processing ends. In a case where the generation management unit 203 determines that an event occurs in the metadata area (YES in step S1003), the processing proceeds to step S1004. In step S1004, the generation management unit 203 increases, by a predetermined amount, the generation frequency of metadata about a moving object within the metadata area where the event occurs.

Alternatively, a plurality of any positions can be set as the metadata area in accordance with a user operation. A metadata area can be automatically set based on an image analysis result obtained by the image analysis unit 201. In a case where the metadata area is automatically set, for example, the image analysis unit 201 recognizes, by image analysis, a road or a gateway through which a moving object frequently passes. As a result, the image analysis unit 201 sets the metadata area. In another example, the image analysis unit 201 may set, as the metadata area, an area where a number of moving objects is large. Examples of the event to occur are abnormal intrusion such that an object intrudes into a certain area, carrying-away of an object placed on a predetermined position, and abandoning of an object such that the object is left on a predetermined position. The other parts of the configuration and the processing of the image capturing device 100 according to the fourth exemplary embodiment are similar to the configuration and the processing of the image capturing device 100 according to the other exemplary embodiments.

As described above, metadata is generated for not an entire video image but for a certain area of the video image where an event occurs. As a result, the metadata can be acquired more efficiently.

In a first modification of the fourth exemplary embodiment, in a case where a number of target objects exist within a metadata area set for any position is a preset threshold or more, the generation management unit 203 may decrease a generation frequency of metadata by a predetermined amount. Accordingly, in a case where a considerable number of target objects are expected to exist in the metadata area like in crowd monitoring, the processing load can be decreased.

In a second modification of the fourth exemplary embodiment, when a crowd is monitored, and in a case where a number of target objects is the preset threshold or more, the generation management unit 203 may decrease types of metadata to be generated and may decrease the generation frequencies by a predetermined amount.

Figure 11:
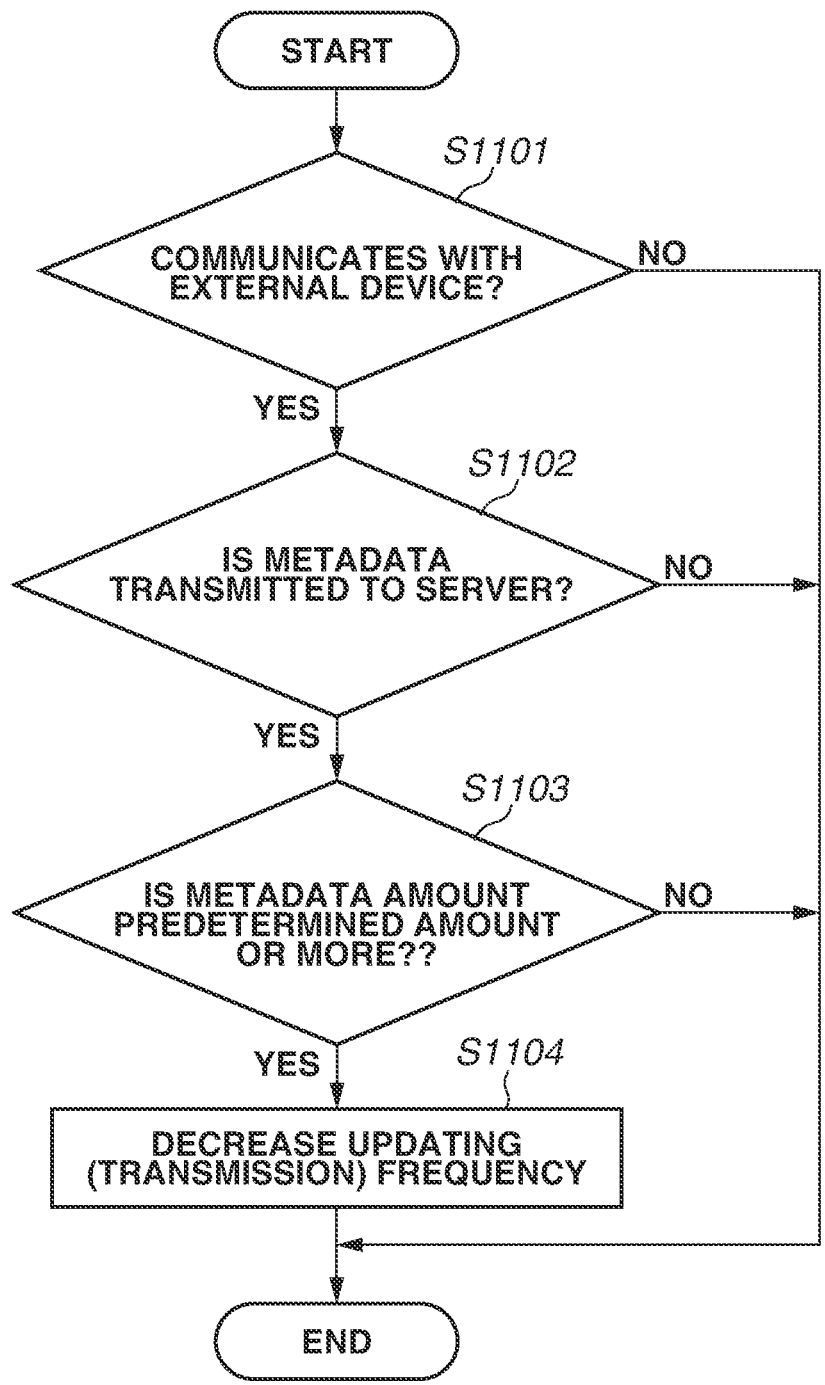
FIG. 11 is a flowchart illustrating transmission frequency setting processing according to one or more aspects of the present disclosure.

A fifth exemplary embodiment will be described below with reference to FIG. 11. In step S1101, in a case where the generation management unit 203 determines that the image capturing device 100 is an independent image capturing device that does not communicate with the external device (NO in step S1101), the processing ends. In a case where the generation management unit 203 determines that the image capturing device 100 communicates with the external device (YES in step S1101), the processing proceeds to step S1102. In step S1102, in a case where the generation management unit 203 does not cause the image capturing device 100 to transmit metadata generated in the image capturing device to the external device (NO in step S1102), the processing ends. In a case where the generation management unit 203 causes the image capturing device 100 to transmit the metadata generated in the image capturing device to the external device (YES in step S1102), the processing proceeds to step S1103.

In step S1103, in a case where the generation management unit 203 determines that the amount of metadata to be transmitted from the image capturing device 100 to the external device is not the preset threshold or more (NO in step S1103), the processing ends. in a case where the generation management unit 203 determines that the amount of the metadata to be transmitted from the image capturing device 100 to the external device is the preset threshold or more (YES in step S1103), the processing proceeds to step S1104. In step S1104, the generation management unit 203 decreases a transmission frequency of metadata to be transmitted to the external device by a predetermined amount.

The transmission of the metadata from the image capturing device 100 to the external device updates metadata in the external device. In the communication between the image capturing device and the external device, a video image and data other than the metadata are transmitted and received. For this reason, a great amount of metadata affects the communication. Therefore, if the amount of the metadata to be transmitted to the external device is the preset threshold or more, the transmission frequency is decreased. With such a configuration, the communication thus becomes not affected by metadata transmission.

In a modification of the fifth exemplary embodiment, the image capturing device 100 may select, as means for transmitting metadata from the image capturing device to the external device, transmission of metadata added to a captured image or transmission of only metadata as text data separately from the captured image. As a selection method, if an amount of metadata to be generated is larger than the preset threshold, the method for transmitting only metadata as text data may be selected.

The description has been provided of the setting of the generation frequency of the metadata. FIG. 12 illustrates a display example of the generated metadata. As illustrated in an upper part of FIG. 12, metadata such as a license plate and a type of vehicle can be displayed separately from a displayed video image. As illustrated in a lower part of FIG. 12, the metadata can be displayed on the display video image in a superimposed manner. That is, the display method may be changed in accordance with a user operation.

The description has been provided of the preferred exemplary embodiments of the present disclosure in detail, but the present disclosure is not limited to the specific exemplary embodiments. Various modifications and corrections can be made without departing from the scope of the present disclosure.

The present disclosure can be implemented by processing for supplying a program for realizing one or more functions according to the above exemplary embodiments to a system or a device via a network or a storage medium and reading and executing the program through one or more processors in a computer of the system or the device. Further, the present disclosure can be implemented by a circuit that realizes one or more functions (for example, an application specific integrated circuits (ASIC)).

According to the present disclosure, control can be made so that metadata of a captured image can be generated at an appropriate frequency.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2017-153205, filed Aug. 8, 2017, and No. 2018-090439, filed May 9, 2018, which are hereby incorporated by reference herein in their entirety.

What is claimed is:

1. An image capturing device comprising a computer executing instructions that, when executed by the computer, cause the computer to function as:
   a detection unit configured to detect an object in a captured image; and
   a generation unit configure to:
   generate metadata related to the object detected by the detection unit at a first interval if a type of the object detected by the detection unit is a first type of an object; and
   generate the metadata related to the object detected by the detection unit at a second interval different from the first interval if the type of the object detected by the detection unit is a second type of an object different from the first type of an object.

2. The image capturing device according to claim 1, wherein the generation unit is configured to generate the metadata at the first interval which is smaller than the second interval if the object is a moving object, and set the second interval if the object is not a moving object.

3. The image capturing device according to claim 1, wherein the generation unit is configured to generate the metadata at the first interval if the object detected by the detection unit is a first predetermined object, and generate the metadata at the second interval if the object detected by the detection unit is a second predetermined object different from the first predetermined object.

4. The image capturing device according to claim 1, wherein the generation unit is configured to generate the metadata at the first interval if the object is a human, and generate the metadata at the second interval if the object is not a human.

5. The image capturing device according to claim 1, further comprising an output unit configured to output the metadata related to the object detected from the captured image and generated by the generation unit.

6. A control method for an image capturing device comprising:
   detecting an object in a captured image;
   generating metadata related to the object detected in the detecting at a first interval if a type of the object detected in the detecting is a first type of an object; and
   generating the metadata related to the object detected in the detecting at a second interval different from the first interval if the type of the object detected in the detecting is a second type of an object different from the first type of an object.

7. A non-transitory storage medium storing a program for causing a computer to execute a control method for an image capturing device, the program being stored in a computer-readable recording medium, the control method comprising:
   detecting an object in a captured image;
   generating metadata related to the object detected in the detecting at a first interval if a type of the object detected in the detecting is a first type of an object; and
   generating the metadata related to the object detected in the detecting at a second interval different from the first interval if the type of the object detected in the detecting is a second type of an object different from the first type of an object.

8. An image capturing device comprising a computer executing instructions that, when executed by the computer, cause the computer to function as:
   a detection unit configured to detect an object in a captured image; and
   a generation unit configured to:
   generate metadata related to the object detected by the detection unit at a first interval if a size of the object detected by the detection unit is a first size; and
   generate the metadata related to the object detected by the detection unit at a second interval different from the first interval if the size of the object detected by the detection unit is a second size different from the first size.

9. The image capturing device according to claim 8, wherein the generation unit is configured to:
   generate the metadata at the first interval which is smaller than the second interval if the size of the object detected by the detection unit is a first size which is equal to or greater than a threshold; and
   generate the metadata at the second interval if the size of the object detected by the detection unit is a second size which is smaller than the threshold.

10. The image capturing device according to claim 8, further comprising an output unit configured to output the metadata related to the object detected from the captured image and generated by the generation unit.

11. An image capturing device comprising a computer executing instructions that, when executed by the computer, cause the computer to function as:
    a setting unit configured to set, based on a type of metadata to be added to a captured image, an interval of generating the metadata;
    a determination unit configured to determine, based on a processing load relating to a generation process for generating the metadata, whether a device executing the generation process is the image capturing device or an external device; and
    a generation unit configured to perform the generation process for generating the metadata at the interval set by the setting unit if it is determined by the determination unit that the device executing the generation process is the image capturing device.

12. The image capturing device according to claim 11, wherein in a case where the processing load is equal to or more than a preset threshold, the determination unit determines that the external device as the device that executes the generation process.

13. The image capturing device according to claim 11, further comprising an output unit configured to output the metadata related to the object detected from the captured image and generated by the generation unit.

14. The image capturing device according to claim 11, wherein the output unit is configured to output a metadata generation instruction and the captured image to the external device if it is determined by the determination unit that the device executing the generation process is the external device.

15. A control method for an image capturing device comprising:
    detecting an object in a captured image;
    generating metadata related to the object detected in the detecting at a first interval if a size of the object detected in the detecting is a first size; and generating the metadata related to the object detected in the detecting at a second interval different from the first interval if the size of the object detected in the detecting is a second size different from the first size.

16. A control method for an image capturing device comprising:
    setting, based on a type of metadata to be added to a captured image, an interval of generating the metadata;
    determining, based on a processing load relating to a generation process for generating the metadata, whether a device executing the generation process is the image capturing device or an external device; and
    performing the generation process for generating the metadata at the interval set in the setting if it is determined in the determining that the device executing the generation process is the image capturing device.

17. A non-transitory storage medium storing a program for causing a computer to execute a control method for an image capturing device, the program being stored in a computer-readable recording medium, the control method comprising:
    detecting an object in a captured image;
    generating metadata related to the object detected in the detecting at a first interval if a size of the object detected in the detecting is a first size; and
    generating the metadata related to the object detected in the detecting at a second interval different from the first interval if the size of the object detected in the detecting is a second size different from the first size.

18. A non-transitory storage medium storing a program for causing a computer to execute a control method for an image capturing device, the program being stored in a computer-readable recording medium, the control method comprising:
    setting, based on a type of metadata to be added to a captured image, an interval of generating the metadata;
    determining, based on a processing load relating to a generation process for generating the metadata, whether a device executing the generation process is the image capturing device or an external device; and
    performing the generation process for generating the metadata at the interval set in the setting if it is determined in the determining that the device executing the generation process is the image capturing device.

* * * * *